United States Patent
Wu

(10) Patent No.: US 11,476,935 B2
(45) Date of Patent: Oct. 18, 2022

(54) OPTICAL NETWORKING METHOD, OPTICAL COMMUNICATION DEVICE, AND OPTICAL NETWORKING SYSTEM

(71) Applicant: Wenjing Wu, Shenzhen (CN)

(72) Inventor: Wenjing Wu, Shenzhen (CN)

(*) Notice: Subject to any disclaimer, the term of this patent is extended or adjusted under 35 U.S.C. 154(b) by 0 days.

(21) Appl. No.: 17/423,260

(22) PCT Filed: Jun. 10, 2019

(86) PCT No.: PCT/CN2019/090550
§ 371 (c)(1),
(2) Date: Jul. 15, 2021

(87) PCT Pub. No.: WO2020/228082
PCT Pub. Date: Nov. 19, 2020

(65) Prior Publication Data
US 2022/0116112 A1   Apr. 14, 2022

(30) Foreign Application Priority Data
May 14, 2019 (WO) ................ PCT/CN2019/086860

(51) Int. Cl.
H04B 10/116 (2013.01)
H04B 10/27 (2013.01)

(52) U.S. Cl.
CPC ........... *H04B 10/116* (2013.01); *H04B 10/27* (2013.01)

(58) Field of Classification Search
CPC .............................. H04B 10/116; H04B 10/27
USPC ........................................................ 398/120
See application file for complete search history.

(56) References Cited

U.S. PATENT DOCUMENTS

| 2013/0278164 | A1  | 10/2013 | Su et al. |
| 2015/0147067 | A1* | 5/2015  | Ryan ....................... H04L 67/12 398/118 |
| 2016/0134370 | A1* | 5/2016  | Huang .................... H02J 50/30 398/118 |
| 2017/0098354 | A1* | 4/2017  | Loeb ..................... H04B 10/116 |
| 2017/0317749 | A1* | 11/2017 | Oshima ................ H04B 10/116 |
| 2022/0182154 | A1* | 6/2022  | Wendt .................. H04B 10/116 |

FOREIGN PATENT DOCUMENTS

| CN | 101867412 A | 10/2010 |
| CN | 102138290 A | 7/2011 |
| CN | 204013542 U | 12/2014 |
| CN | 106100798 A | 11/2016 |
| CN | 205864426 U | 1/2017 |
| CN | 107094048 A | 8/2017 |
| CN | 107395273 A | 11/2017 |

(Continued)

OTHER PUBLICATIONS

International Search Report and Written Opinion of the International Searching Authority, issued in PCT/CN2019/090550, dated Feb. 12, 2020; ISA/CN.

*Primary Examiner* — Dalzid E Singh
(74) *Attorney, Agent, or Firm* — Brooks Kushman P.C.

(57) ABSTRACT

The present application is applied for the field of optical networking technologies, and provides an optical networking method, an optical communication device and an optical networking system, which can use natural light to realize optical networking communication between optical communication devices and can effectively prevent interference from electromagnetic signals.

20 Claims, 3 Drawing Sheets

(56) References Cited

FOREIGN PATENT DOCUMENTS

| CN | 207652468 U | 7/2018 |
| CN | 109525313 A | 3/2019 |
| CN | 210093229 U | 2/2020 |

* cited by examiner

OPTICAL NETWORKING METHOD, OPTICAL COMMUNICATION DEVICE, AND OPTICAL NETWORKING SYSTEM

CROSS-REFERENCE TO RELATED APPLICATIONS

This application claims priority of PCT Application No. PCT/CN2019/086860 filed on May 14, 2019, and is a National Stage of PCT Application No. PCT/CN2019/090550 filed on Jun. 10, 2019, the contents of which are incorporated herein by reference thereto.

TECHNICAL FIELD

The present application involves in the field of optical networking technologies, and particularly relates to an optical networking method, an optical communication device, and an optical networking system.

BACKGROUND

With continuous development of communication technologies, various electronic devices with communication functions emerge in an endless stream, bringing great convenience to people's daily production and life.

Technical Problem

When existing electronic devices perform communication networking, they usually adopt a wired network or a wireless network such as Bluetooth, WiFi, ZigBee, etc. to realize communication connection between various network nodes of the communication network, and this kind of communication networking method usually requires a power supply and is easy to be interfered by electromagnetic signals.

SUMMARY

Given this, the present application provides an optical networking method, an optical communication device and an optical networking system, so as to solve the problems that the existing communication networking methods achieved by utilizing a wired network or a wireless network usually require to be powered and are easy to be interfered by electromagnetic signals.

A first aspect of embodiments of the present application provides an optical networking method, which is applied to an optical communication device of an optical networking system, the optical networking system includes at least two of the optical communication devices, the optical communication device includes a signal lamp, and the optical networking method includes steps of:

converting a natural optical signal into a first pulse current;

controlling the signal lamp to start flickering at a first preset flicker frequency according to the first pulse current;

controlling the signal lamp to start flickering at a second preset flicker frequency according to a preset optical coding data when the optical communication device is arranged as a primary optical communication device, so as to send an optical signal to a secondary optical communication device;

converting the optical signal emitted by the signal lamp of the other optical communication device arranged as the primary optical communication device into a second pulse current when the optical communication device is arranged as the secondary optical communication device; controlling the signal lamp to start flickering at a third preset flicker frequency according to the second pulse current.

A second aspect of embodiments of the present application provides an optical communication device, which includes:

a signal lamp;

a photovoltaic panel configured to convert a natural optical signal into a first pulse current;

a luminous energy collection and control module, electrically connected to the photovoltaic panel and the signal lamp, and configured to: control the signal lamp to start flickering at a first preset flicker frequency according to the first pulse current, and control the signal lamp to start flickering at a second preset flicker frequency according to a preset optical coding data when an optical communication device is arranged as a primary optical communication device;

wherein the photovoltaic panel is further configured to convert an optical signal emitted by the signal lamp of other optical communication device arranged as the primary optical communication device into a second pulse current when the optical communication device is arranged as a secondary optical communication device;

the luminous energy collection and control module is further configured to control the signal lamp to start flickering at a third preset flicker frequency according to the second pulse current.

In an embodiment, the optical communication device further includes:

a rechargeable battery, electrically connected to the signal lamp and the luminous energy collection and control module, and configured to supply power to the signal lamp and the luminous energy collection and control module;

wherein the luminous energy collection and control module includes:

a voltage detection unit, electrically connected to the photovoltaic panel, and configured to detect magnitude of the first pulse current;

an electronic switch unit electrically connected to the photovoltaic panel;

a control unit, electrically connected to the signal lamp, the voltage detection unit and the electronic switch unit, and configured to: control the signal lamp to start flickering at the first preset flicker frequency when the first pulse current is less than a first preset current threshold, control the signal lamp to start flickering at the second preset flicker frequency according to the preset optical coding data when the optical communication device is arranged as the primary optical communication device, charging the rechargeable battery via the first pulse current;

a voltage stabilizing unit, electrically connected to the electronic switch unit, the control unit and the rechargeable battery, and configured to supply power for the control unit.

In an embodiment, the luminous energy collection and control module further includes:

a crystal oscillator unit electrically connected to the control unit and configured to generate a clock signal and output the clock signal to the control unit;

wherein the control unit is further configured to: perform timing according to the clock signal, control the signal lamp to start flickering at the first preset flicker frequency at a start time point of a next M-th cycle of the first pulse current, and control the signal lamp to start flickering at the third preset flicker frequency at a start time point of a next N-th cycle of the second pulse current;

wherein, $M \geq 1$, $N \geq 1$, and M and N are integers.

In an embodiment, the control unit and the rechargeable battery are electrically connected to a load;

wherein the control unit, according to the clock signal, is configured to: trigger the load to start working after the signal lamp starts flickering at the second preset flicker frequency for a first preset time, and trigger the load to start working after the signal lamp starts flickering at the third preset flicker frequency for a second preset time.

In an embodiment, the voltage detection unit includes a high-precision low-voltage detector.

In an embodiment, the electronic switch unit includes a transistor.

In an embodiment, the control unit includes a single-chip microcomputer.

In an embodiment, the voltage stabilizing unit includes a voltage stabilizing chip or a voltage stabilizing diode.

In an embodiment, the second preset flicker frequency is equal to the third preset flicker frequency.

In an embodiment, the signal lamp includes at least one of a signal lamp emitting visible light and a signal lamp emitting infrared light;

wherein the photovoltaic panel comprises an infrared receiver when the signal lamp comprises the signal lamp emitting infrared light.

A third aspect of embodiments of the present application provides an optical networking system, which includes at least two of the optical communication devices described above, and the at least two of the optical communication devices include at least one primary optical communication device and at least one secondary optical communication device.

Beneficial Effects

The embodiments of the present application provide an optical networking method, which converts a natural optical signal into a first pulse current; controls the signal lamp to start flickering at a first preset flicker frequency; controls the signal lamp to start flickering at a second preset flicker frequency according to a preset optical coding data when the optical communication device is arranged as a primary optical communication device, so as to send an optical signal to a secondary optical communication device; converts the optical signal emitted by the signal lamp of the other optical communication device arranged as the primary optical communication device into a second pulse current when the optical communication device is arranged as the secondary optical communication device; and controls the signal lamp to start flickering at a third preset flicker frequency according to the second pulse current. The method can utilize the natural light to realize the optical networking communication between the optical communication devices, and can effectively prevent the interference of electromagnetic signals.

DESCRIPTION OF THE DRAWINGS

In order to more clearly illustrate the technical solutions in the embodiments of the present application, the drawings needed to be used in the description for the embodiments or the prior art will be briefly introduced below. Obviously, the accompanying drawings in the following description are only some embodiments of the present application, and other drawings may be obtained based on these drawings for those of ordinary skill in the art without creative work.

DETAILED DESCRIPTION

Figure 1:
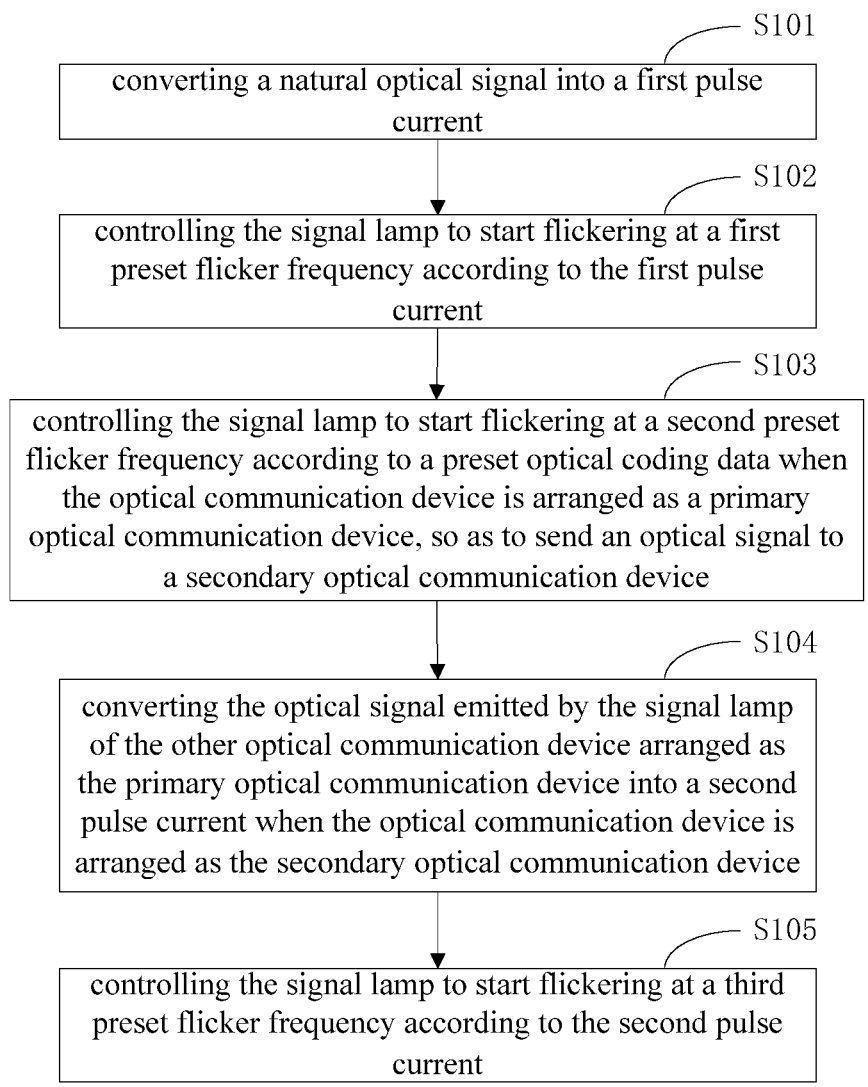
FIG. 1 is a schematic flowchart of an optical networking method provided by a first embodiment of the present application.

In order to enable those skilled in the art to better understand the solutions of the present application, the technical solutions in the embodiments of the present application will be clearly described below in conjunction with the drawings in the embodiments of the present application. Obviously, the described embodiments are part of the embodiments of the present application, but not all of the embodiments. Based on the embodiments in the present application, all other embodiments obtained by those of ordinary skill in the art without creative work should fall within the protection scope of the present application.

The terms "comprising" in the specification and claims of the present application and the above-mentioned drawings and any variations thereof are intended to cover a non-exclusive inclusion. For example, a process, method, system, product, or device that includes a series of steps or units is not limited to listed steps or units, but optionally further includes an unlisted step or unit, or optionally further includes other steps or units inherent in this process, method, product or device. In addition, the terms "first", "second" and "third" are used to distinguish different objects, rather than to describe a specific order.

First Embodiment

This embodiment provides an optical networking method, which is applied to an optical communication device of an optical networking system. The optical networking system includes at least two optical communication devices, and the optical communication device includes a signal lamp. The at least two optical communication devices of the optical networking system include at least one primary optical communication device and at least one secondary optical communication device. The primary optical communication device and its corresponding secondary optical communication device are located in the same physical space, so that an optical signal emitted by the signal lamp of the primary optical communication device can be detected by the secondary optical communication device, thereby realizing optical communication between the primary optical communication device and its corresponding secondary optical communication device.

In applications, the optical communication device may be a lamp such as a street lamp, a landscape lamp, an emergency lamp, a household illumination lamp, etc., or a smart appliance such as a switch, a television, a refrigerator, a washing machine, and an air conditioner, etc. The signal lamp may be any light emitting device, for example, a light emitting diode. The light emitting diode may be a light emitting diode emitting visible light or a light emitting diode emitting infrared light, and the visible light and the infrared light may be coherent light (for example, laser) or incoherent light. Correspondingly, the light emitting diode emitting visible light may be a visible laser diode, and the light emitting diode emitting infrared light may be an infrared laser diode.

In an embodiment, the signal lamp includes at least one of a signal lamp emitting visible light and a signal lamp emitting infrared light; and when the signal lamp includes the signal lamp emitting infrared light, a photovoltaic panel includes an infrared receiver.

In an embodiment, the signal lamp emitting visible light is a signal lamp emitting visible laser, the infrared signal lamp is a signal lamp emitting infrared laser, and the infrared receiver is an infrared laser receiver.

In an application, by adopting the signal lamp emitting infrared light, the signal lamp emitting visible laser or the signal lamp emitting infrared laser, the optical signal sent out by the primary optical communication device is provided with good penetration and a long transmission distance, which can effectively improve an optical communication distance between the primary optical communication device and the secondary optical communication device. In an application, the optical networking method may be a software program in a processor of the optical communication device, which may be stored in a computer-readable storage medium and called and executed by the processor.

In an application, the processor may be a CPU (central processing unit), or may also be other general-purpose processor, DSP (digital signal processor), ASIC (application specific integrated circuit), FPGA (field-programmable gate array), or other programmable logic device, discrete gate or transistor logic device, discrete hardware component, etc. The general-purpose processor may be a microprocessor, or the processor may also be any conventional processor or the like. The computer-readable storage medium may be an internal storage unit of a solar energy device, such as a hard disk or a memory. The computer-readable storage medium may also be an external storage device of the solar device, such as a plug-in hard disk, a SMC (smart media card), a SD (secure digital) card, or a flash card, etc.

As shown in FIG. 1, the optical networking method provided in this embodiment includes the following.

At a step S101, convert a natural optical signal into a first pulse current.

In an application, the natural optical signal may be converted into the first pulse current through a photodiode or photovoltaic panel, and magnitude of the first pulse current is positively correlated with intensity of the natural optical signal.

In an application, the photodiode and the photovoltaic panel may be a micro-energy collection device that can work in a low-light environment and can convert an extremely weak optical signal in the environment into a pulse current. The value of the light intensity in the low-light environment may range within (0 lux, 50 lux], for example, 5 lux or 10 lux.

At a step S102, control the signal lamp to start flickering at a first preset flicker frequency according to the first pulse current.

In an application, the signal lamp may be controlled to start flickering according to the magnitude of the first pulse current, for example, the signal lamp may be controlled to start flickering when the first pulse current is greater than or equal to a certain preset current threshold.

In an embodiment, before step S102, the method includes:
detecting the magnitude of the first pulse current;
correspondingly, the step S102 includes:
controlling the signal lamp to start flickering at the first preset flicker frequency when the first pulse current is less than a first preset current threshold.

In an application, the first preset current threshold may be set according to an actual need, and the first preset current threshold may be set to be a maximum pulse current value that the photodiode and photovoltaic panel can output in the low-light environment.

In an application, the first preset flicker frequency and its duty ratio may be set according to an actual need. For example, the first preset flicker frequency may be 60 Hz and the duty ratio is 1/10, that is, the signal lamp flickers one time every one second, and each flicker lasts for 100 milliseconds. The first preset flicker frequency and its duty ratio may also be set to be the same as the frequency and duty ratio of the first pulse current, that is, the signal lamp may be directly driven to flicker through the first pulse current, so that the flicker frequency of the signal lamp is the same as the frequency of the first pulse current.

In an application, a start time point at which the signal lamp starts flickering at the first preset flicker frequency may be preset according to an actual need. For example, it may be set as the start time point of the next M-th cycle of the first pulse current, where M>0, M may be an integer or a decimal.

In an embodiment, the step S102 includes:
according to the first pulse current, controlling the signal lamp to start flickering at the first preset flicker frequency at the start time point of the next M-th cycle of the first pulse current;
where, $M \geq 1$ and M is an integer.

In an embodiment, before the step S102, the method further includes:
monitoring a current time;
the step S102 includes:
when the current time reaches a preset time point, controlling the signal lamp to start flickering at the first preset flicker frequency according to the first pulse current.

In the application, the current time may also be monitored, and the signal lamp may be controlled to start at a regular time. When the first pulse current is greater than or equal to a certain preset current threshold and the current time reaches a preset time point, the signal lamp can be controlled to start flickering. The preset time point may be set according to an actual need, for example, the preset time point may be any time point between 17:00 and 19:00.

At a step S103, when the optical communication device is arranged as the primary optical communication device, control the signal lamp to start flickering at a second preset flicker frequency according to a preset optical coding data to send an optical signal to the secondary optical communication device.

In an application, the optical communication device may be used as the primary optical communication device or as the secondary optical communication device. The optical communication device may be arranged as the primary optical communication device or the secondary optical communication device through connecting a mobile phone, a tablet computer, a notebook computer, a personal computer, a test device, etc., to a programming interface of the optical communication device before or after the optical communication device leaves the factory. The primary optical communication device controls a working state of its corresponding secondary optical communication device by sending out an optical signal.

In an application, the preset optical coding data is binary coding data, which is obtained by performing binary coding on control information, and the control information is used to control the working state of the secondary optical communication device. The preset optical encoding data controls the flicker frequency and the duty ratio of the flicker frequency of the signal lamp by controlling the pulse current output to the signal lamp. The binary code "0" in the preset optical coding data corresponds to a low-level signal in the pulse current, and the binary code "1" in the preset optical coding data corresponds to a high-level signal in the pulse current. The signal lamp turns off when receiving the low-level signal, and turns on when receiving the high-level.

In an application, the second preset flicker frequency and its duty ratio may be set according to an actual need. For example, the second preset flicker frequency may be 120 Hz and the duty ratio is 1/5, that is, the signal lamp flickers two times every one second, and each flicker lasts for 200 milliseconds.

In an application, a start time point at which the signal lamp starts flickering at the second preset flicker frequency may be preset according to an actual need. For example, it may be set as a start time point of the next N-th cycle of a second pulse current, where N>0, N may be an integer or a decimal.

In an embodiment, the step S103 includes:

according to the preset optical encoding data, controlling the signal lamp to start flickering at a third preset flickering frequency at the start time point of the next N-th cycle of the second pulse current; where $N \geqslant 1$ and N is an integer.

At a step S104, when the optical communication device is arranged as the secondary optical communication device, convert an optical signal emitted by a signal lamp of other optical communication device arranged as the primary optical communication device into the second pulse current.

In an application, the photodiode or the photovoltaic panel may be used to convert the optical signal emitted by the signal lamp of the primary optical communication device into the second pulse current, and the frequency and duty ratio of the second pulse current are the same as the second preset flicker frequency. The second pulse current may further be decoded into the preset optical encoding data, so that the control information carried by the preset optical encoding data may be identified, so as to control the working state of the secondary optical communication device according to the control information.

At a step S105, control the signal lamp to start flickering at a third preset flicker frequency according to the second pulse current.

In an application, the third preset flicker frequency and its duty ratio may be set according to the control information carried in the preset optical encoding data decoded from the second pulse current. For example, the third preset flicker frequency may be 30 Hz, and the duty ratio is 1/5, that is, the signal lamp flickers one time every two seconds, and each flicker lasts for 200 milliseconds. The third preset flicker frequency and its duty ratio may also be set as the same as the frequency and duty ratio of the second pulse current, that is, the signal lamp may be driven to flicker directly by the second pulse current, so that the flicker frequency of the signal lamp is the same as the frequency of the second pulse current.

In an embodiment, the second preset flicker frequency is equal to the third preset flicker frequency.

In an application, the second preset flicker frequency and its duty ratio may be set as the same as the third preset flicker frequency and its duty ratio, so that the signal lamp of the primary communication device and the signal lamp of the secondary communication device may flicker synchronously.

In an application, it can be known based on the steps S101 and S102 that, all optical communication devices of the optical networking system may control their respective signal lamps to automatically flicker according to the first pulse current converted from the natural optical signal. After detecting the optical signal sent by the primary optical communication device, the secondary optical communication device controls the respective signal lamps to flicker with the signal lamp of the primary optical communication device according to the second pulse current converted from the optical signal sent by the primary optical communication device, thereby achieving optical networking of all optical communication devices.

In an embodiment, the optical communication device further includes a rechargeable battery; and the optical networking method further includes:

charging the rechargeable battery through the first pulse current.

In an embodiment, charging the rechargeable battery through the first pulse current includes:

charging the rechargeable battery through the first pulse current when the first pulse current is greater than or equal to a second preset current threshold.

In an application, the second preset current threshold may be set according to an actual need, and the second preset current threshold may be set as a minimum pulse current value that the photodiode and photovoltaic panel can output in a strong-light environment.

In an application, the photodiode and the photovoltaic panel may be an energy collection device that can work in a strong-light environment and can convert the optical signal into the pulse current. A value of light intensity in the strong-light environment may range within [50 lux,+∞], for example, 100 lux. The second preset current threshold may be equal to the first preset current threshold.

In an embodiment, the optical communication device is electrically connected to a load; and After the step S105, the method further includes:

when the optical communication device is arranged as the primary optical communication device, triggering the load to start working after the signal lamp starts flickering at the second preset flicker frequency for a first preset time;

when the optical communication device is arranged as the secondary optical communication device, triggering the load to start working after the signal lamp starts flickering at the third preset flicker frequency for a second preset time.

In an application, the optical communication device may control the load to start working after the signal lamp starts flickering for a period of time. The first preset time and the second preset time may be set according to an actual need. The load may be powered by other power supply device that is electrically connected to the load, for example, a solar photovoltaic power supply device, an AC power supply device, a battery, a DC power supply device, etc. The load may also be powered by a rechargeable battery of the optical communication device. Depending on the type of the optical communication device, the load is also different, for example, when the optical communication device is a switch, the load may be a lamp or a smart appliance that is turned on by control of the smart switch.

In an embodiment, the time after the signal lamp starts flickering at the second preset flicker frequency for the first preset time is the same time with the time after the signal lamp starts flickering at the third preset flicker frequency for the second preset time, that is, the load connected to the primary communication device and the load connected to the secondary communication device are started at the same time.

In an embodiment, after triggering the load to start working, the method includes:

triggering the load to stop working when the first pulse current is greater than or equal to the second preset current threshold.

In an application, when the light intensity of the natural light is strong, the optical communication device may trigger the load to stop working. For example, when the load is a lamp, the optical communication device may trigger the lamp to be turned off in the strong light environment.

In an embodiment, after triggering the load to start working, the method includes:

detecting a continuous working time of the load;

triggering the load to stop working when the continuous working time of the load is greater than the third preset time.

In an application, the third preset time may be set according to an actual need. After the load continues to work for a period of time, the optical communication device may trigger the load to stop working. For example, when the load is an air conditioner and the air conditioner continues to work for a period of time, the optical communication device may trigger the air conditioner to be turned off or standby.

This embodiment provides an optical networking method applied in an optical communication device of an optical networking system, in which: the signal lamp is controlled to start flickering at the first preset flicker frequency according to the first pulse current converted from the natural optical signal; when the optical communication device is arranged as the primary optical communication device, the signal lamp is controlled to start flickering at the second preset flicker frequency according to the preset optical coding data to send the optical signal to the secondary optical communication device; when the optical communication device is arranged as the secondary optical communication device, the optical signal emitted by the signal lamp of other optical communication device arranged as the primary optical communication device is converted into the second pulse current; the signal lamp is controlled to start flickering at the third preset flicker frequency according to the second pulse current, and the natural light may be used to realize the optical networking communication between the optical communication devices, which can effectively prevent interference from electromagnetic signals.

It should be understood that the sequence numbers of the various steps in the foregoing embodiments do not mean execution sequences, and the execution sequences of the various processes should be determined by their functions and internal logic, and should not constitute any limitation on the implementation processes of the embodiments of the present application.

Second Embodiment

Figure 2:
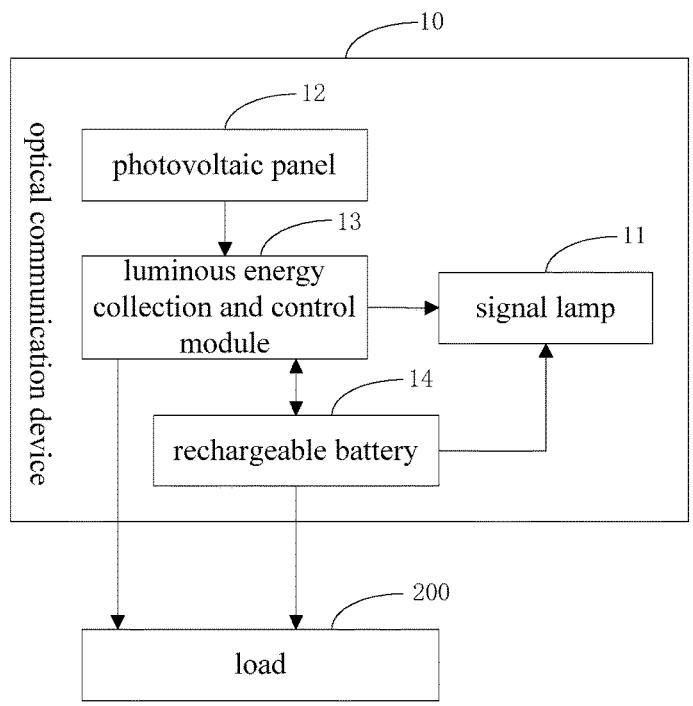
FIG. 2 is a schematic structural diagram of an optical communication device provided by a second embodiment of the present application.

As shown in FIG. 2, this embodiment provides an optical communication device 10, which is applied to an optical networking system. The optical networking system includes at least two optical communication devices 10, and the optical communication devices 10 are used to execute the steps of the method in the first embodiment. The optical communication device 10 includes:

a signal lamp 11;

a photovoltaic panel 12 configured to convert a natural optical signal into a first pulse current;

a luminous energy collection and control module 13, electrically connected to the photovoltaic panel 12 and the signal lamp 11 and configured to control the signal lamp 11 to start flickering at a first preset flicker frequency according to the first pulse current; and configured to control the signal lamp 11 to start flickering at a second preset flicker frequency according to a preset optical encoding data when the optical communication device 10 is arranged as a primary optical communication device;

wherein the photovoltaic panel 12 is further configured to convert an optical signal emitted by the signal lamp of other optical communication device arranged as the primary optical communication device into a second pulse current when the optical communication device 10 is arranged as a secondary optical communication device;

the luminous energy collection and control module 13 is further configured to control the signal lamp 11 to start flickering at a third preset flicker frequency according to the second pulse current;

the device 10 further includes a rechargeable battery 14 electrically connected to the signal lamp 11 and the luminous energy collection and control module 13 and configured to supply power for the signal lamp 11 and the luminous energy collection and control module 13.

In an application, the optical communication device may be used as the primary optical communication device or as the secondary optical communication device. The optical communication device is arranged as the primary optical communication device or the secondary optical communication device through connecting a mobile phone, a tablet, a laptop, a personal computer, a test device, etc. to a programming interface of the optical communication device before or after the optical communication device leave the factory.

In an application, the signal lamp may be any light emitting device, for example, a light emitting diode. The light emitting diode may be a light emitting diode emitting visible light or a light emitting diode emitting infrared light, and the visible light and the infrared light may be coherent light (for example, laser) or incoherent light. Correspondingly, the light emitting diode emitting visible light may be a visible laser diode, and the light emitting diode emitting infrared light may be an infrared laser diode. The photovoltaic panel may be a monolithic or array semiconductor photovoltaic cell, for example, a monocrystalline silicon or polycrystalline silicon photovoltaic cell. The photovoltaic panel may be equivalently replaced with a photosensitive device, such as a photodiode. The photodiode may be a visible light receiving diode, an infrared light receiving diode, a visible laser receiving diode, or an infrared laser receiving diode. The luminous energy collection and control module may be a control device with functions of voltage monitoring or current monitoring as well as electric energy output control. For example, the luminous energy collection and control module is a combination of a voltage detector or a current detector, a single-chip microcomputer and an electronic switch tube. The rechargeable battery may be a single battery or a battery pack, for example, a rechargeable lithium battery or a button battery.

In an embodiment, the signal lamp includes at least one of the signal lamp emitting visible light and the signal lamp emitting infrared light; and when the signal lamp includes the signal lamp emitting infrared light, the photovoltaic panel includes an infrared receiver.

In an embodiment, the signal lamp emitting visible light is a signal lamp emitting visible laser, the infrared signal lamp is a signal lamp emitting infrared laser, and the infrared receiver is an infrared laser receiver.

In an application, the luminous energy collection and control module may be a central processing unit, or may be other general-purpose processor, digital signal processor, an application specific integrated circuit, a field programmable gate array, or other programmable logic device, a discrete gate, or a transistor logic device, a discrete hardware component, etc. The general-purpose processor may be a microprocessor or the processor may also be any conventional processor or the like.

In an embodiment, the luminous energy collection and control module is a 32-bit microcontroller with a mode number of HC32L110.

In an embodiment, the luminous energy collection and control module is further configured to charge the rechargeable battery through the first pulse current.

As shown in FIG. 2, in this embodiment, the luminous energy collection and control module 13 and the rechargeable battery 14 are electrically connected to the load 200;

the luminous energy collection and control module 13 is further configured, when the optical communication device 10 is arranged as the primary optical communication device, to trigger the load 200 to start working after the signal lamp 11 starts flickering at the second preset flicker frequency for a first preset time; and configured, when the optical communication device 10 is arranged as the secondary optical communication device, to trigger the load 200 to start working after the signal lamp 11 starts flickering at the third preset flicker frequency for a second preset time.

In an embodiment, the luminous energy collection and control module is further configured to trigger the load to stop working when the first pulse current is greater than or equal to the second preset current threshold.

In an embodiment, the luminous energy collection and control module is further configured to detect a continuous working time of the load; and configured to trigger the load to stop working when the continuous working time of the load is greater than a third preset time.

This embodiment provides an optical communication device applied to an optical networking system, which: controls the signal lamp to start flickering at the first preset flicker frequency according to the first pulse current converted from the natural optical signal; the optical communication device is set as the primary optical communication device, controls the signal lamp to start flickering at the second preset flicker frequency according to the preset optical encoding data when the optical communication device is arranged as the primary optical communication device, so as to send the optical signal to the secondary optical communication device; converts the optical signal emitted by the signal lamp of other optical communication device arranged as the primary optical communication device into the second pulse current when the optical communication device is arranged as the secondary optical communication device;

controls the signal lamp to start flickering at the third preset flicker frequency according to the second pulse current. Therefore, the natural light may be used to realize the optical networking communication between the optical communication devices, which can effectively prevent the interference of electromagnetic signals.

Third Embodiment

Figure 3:
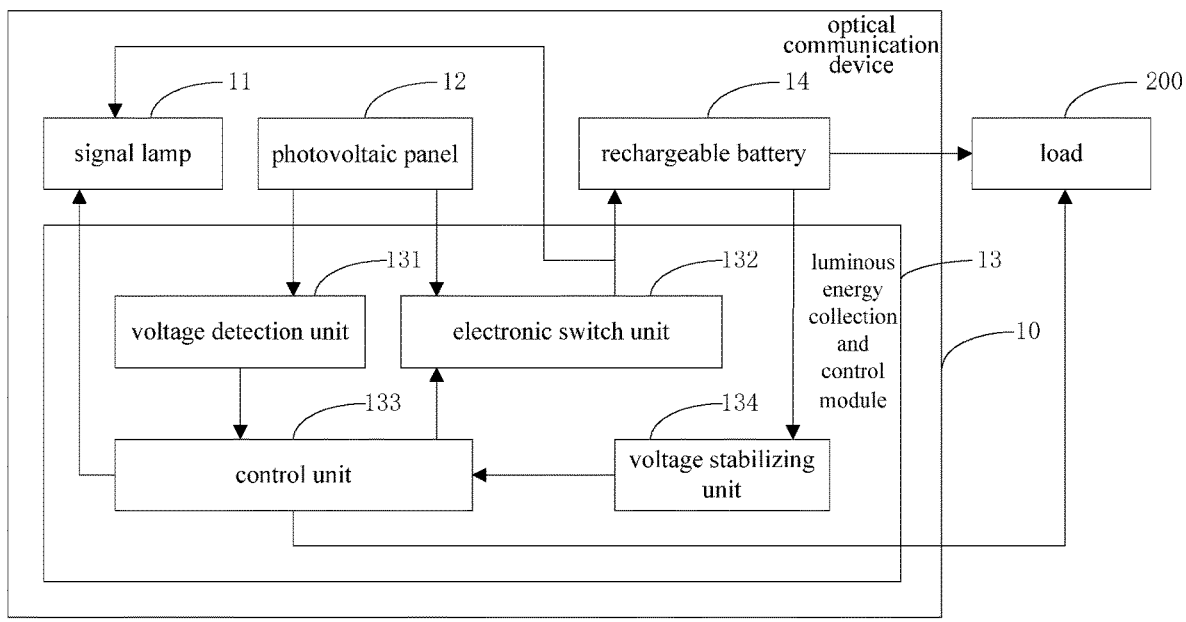
FIG. 3 is a schematic structural diagram of an optical communication device provided by a third embodiment of the present application.

As shown in FIG. 3, in this embodiment, the luminous energy collection and control module 13 includes:

a voltage detection unit 131 electrically connected to the photovoltaic panel 12 and configured to detect magnitude of the first pulse current;

an electronic switch unit 132 electrically connected to the signal lamp 11, the photovoltaic panel 12 and the rechargeable battery 14;

a control unit 133, electrically connected to the signal lamp 11, the load 200, the voltage detection unit 131 and the electronic switch unit 132, and configured to: control the signal lamp 11 to start flickering at the first preset flicker frequency when the first pulse current is less than a first preset current threshold; control the signal lamp 11 to start flickering at the second preset flicker frequency according to the preset optical coding data when the optical communication device 10 is arranged as the primary optical communication device; and control the electronic switch unit 132 to turn on so that the first pulse current charges the rechargeable battery 14;

a voltage stabilizing unit 134 electrically connected to the electronic switch unit 132, the control unit 133 and the rechargeable battery 14 and configured to supply power for the control unit 133.

In an application, the control unit may be a central processing unit, or may be other general-purpose processor, or a digital signal processor, an application specific integrated circuit, a field programmable gate array or other programmable logic device, or a discrete gate, or a transistor logic device, a discrete hardware component, etc. The general-purpose processor may be a microprocessor or the processor may also be any conventional processor or the like. The voltage detection unit may include a high-precision voltage detector. The electronic switch unit may include a transistor, for example, a triode or a field effect transistor. The control unit may include a single-chip microcomputer. The voltage stabilizing unit may include a voltage stabilizing chip or a voltage stabilizing diode.

In an embodiment, the second control unit includes a single-chip microcomputer.

In an embodiment, the voltage detection unit includes a high-precision low-voltage detector with a mode number of BL8506.

In an embodiment, the electronic switch unit includes a field effect transistor with a mode number of AO3401. In an embodiment, the voltage stabilizing unit includes a voltage stabilizing chip with a model number of ME6214.

In an embodiment, when the first preset flicker frequency and its duty ratio are the same as the frequency and duty ratio of the first pulse current, the control unit is further configured to control the electronic switch unit to be turned on, so that the first pulse current drives the signal lamp to flicker, thereby the flicker frequency of the signal lamp is the same as the frequency of the first pulse current.

In an embodiment, when the third preset flicker frequency and its duty ratio are the same as the frequency and duty ratio of the second pulse current, the control unit is further configured to control the electronic switch unit to be turned on, so that the second pulse current drives the signal lamp to flicker, thereby the flicker frequency of the signal lamp is the same as the frequency of the second pulse current.

In an embodiment, the control unit is further configured to control the electronic switch unit to turn off so that the first pulse current stops supplying power for the rechargeable battery.

In an embodiment, the luminous energy collection and control module further includes:

a crystal oscillator unit, electrically connected to the control unit, and configured to generate a clock signal and output the clock signal to the control unit;

the control unit controls the signal lamp to start flickering at the first preset flicker frequency at a start time point of a next M-th cycle of the first pulse current according to the clock signal, and controls the signal lamp to start flickering at the third preset flicker frequency at a start time point of a next N-th cycle of the second pulse current;

where $M \geqslant 1$, $N \geqslant 1$, and M and N are integers.

In an embodiment, the control unit and the rechargeable battery are electrically connected to the load; According to the clock signal, the control unit triggers the load to start working after the signal lamp starts flickering at the second preset flicker frequency for the first preset time; and triggers the load to start working after the signal lamp starts flickering at the third preset flicker frequency for the second preset time.

Figure 4:
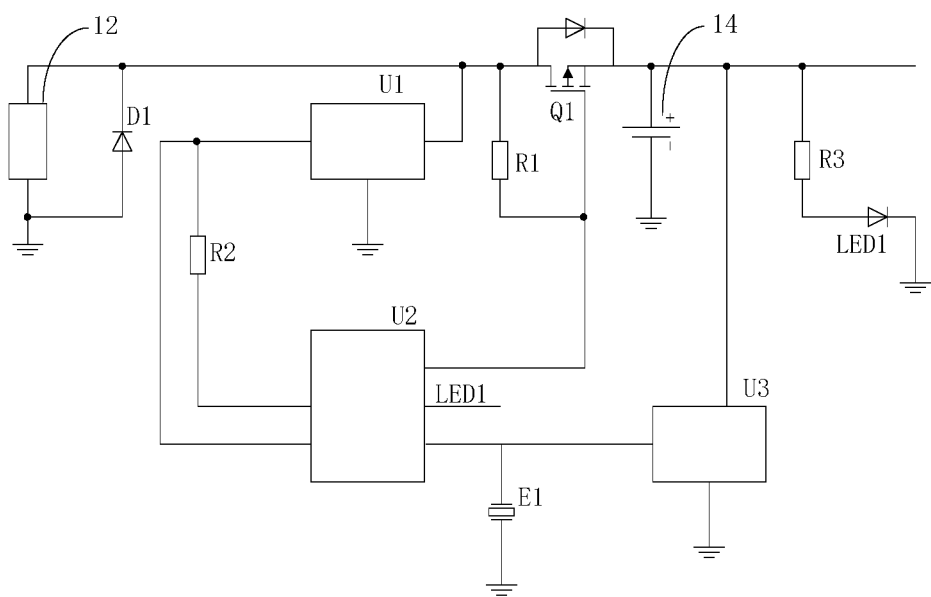
FIG. 4 is a schematic diagram of a circuit of the optical communication device provided by the third embodiment of the present application.

As shown in FIG. 4, in this embodiment, the photovoltaic panel 12 is a photovoltaic cell and is electrically connected to a TVS (transient voltage suppressor) D1;

the voltage detection unit 131 includes a high-precision voltage detector U1;

the electronic switch unit 132 includes a field effect tube Q1 and a first resistor R1;

the control unit 133 includes a single-chip microcomputer U2 and a second resistor R2, and the crystal oscillator unit includes a crystal oscillator E1;

the voltage stabilizing unit 134 includes a voltage stabilizing chip U3;

the rechargeable battery 14 is a lithium ion battery; and the signal lamp 11 includes a third resistor R3 and an LED lamp LED1.

Among them, a positive pole (SC+) of the photovoltaic panel 12 is electrically connected to a positive pole of the TVS D1, an input terminal (IN) of the high-precision voltage detector U1, an input terminal of the field effect tube Q1 and one terminal of the first resistor R1, and a negative pole (SC−) of the photovoltaic panel 12 and a negative pole of the TVS D1 are grounded; an output terminal (OUT) of the high-precision voltage detector U1 is electrically connected to a signal input terminal (IN_DECT) of the single-chip microcomputer U2 and one terminal of the second resistor R2, and a ground terminal (GND) of the high-precision voltage detector U1 is grounded;

an output terminal of the field effect tube Q1 is electrically connected to a positive pole (BAT+) of the rechargeable battery 14, an input terminal (Vin) of the voltage stabilizing chip U3, one terminal of the third resistor R3, an LED control terminal (LED1) of the single-chip microcomputer U2 and the load 200, and a controlled terminal of the field effect tube Q1 is electrically connected to another terminal of the first resistor R1 and a luminous energy turn-on terminal (SOLAR_ON) of the single-chip microcomputer U2;

a positive digital power and voltage terminal (DVCC) of the single-chip microcomputer U2 is electrically connected with a positive pole of the crystal oscillator E1 and an output terminal (Vout) of the voltage stabilizing chip U3;

an negative pole of crystal oscillator E1 is grounded; and another terminal of the second resistor R2 is electrically connected to a control signal (CHK PORT) of the single-chip microcomputer U2.

A ground terminal (Vss) of the voltage stabilizing chip U3 is grounded;

a negative pole (BAT−) of the rechargeable battery 14 is grounded; and another terminal of the third resistor R3 is electrically connected to a positive pole of the LED lamp LED1.

A negative pole of the LED lamp LED1 is grounded. In this embodiment, through detecting the magnitude of the pulse current output by the photovoltaic panel, the signal lamp of the primary communication device may be triggered to emit an optical signal according to the magnitude of the pulse current, and then the optical signal emitted from the signal lamp of the primary communication device triggers the signal lamp of the secondary communication device to emit an optical signal, thereby realizing the optical communication and synchronous flicker between the primary communication device and the secondary communication device.

Fourth Embodiment

Figure 5:
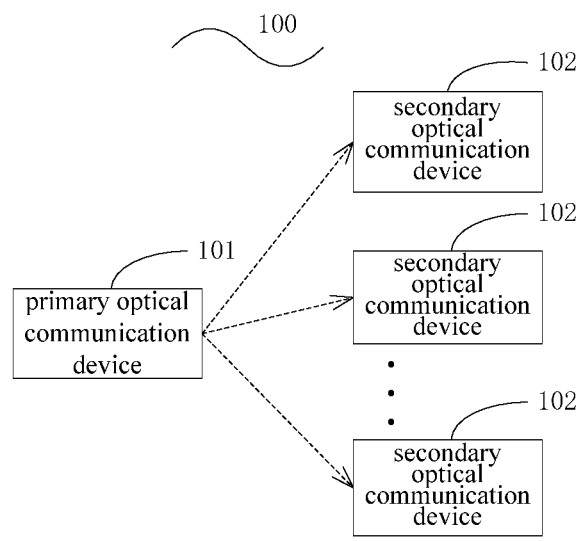
FIG. 5 is a schematic structural diagram of an optical networking system provided by a fourth embodiment of the present application.

As shown in FIG. 5, this embodiment provides an optical networking system 100, which includes at least two optical communication devices in the second or third embodiment; the at least two optical communication devices include at least one primary optical communication device 101 and at least one secondary optical communication device 102, and the primary optical communication device 101 and the secondary optical communication device 102 are located in the same physical space and perform the optical communication.

FIG. 5 exemplarily shows that the optical networking system 100 includes one primary optical communication device 101 and a plurality of secondary devices 102.

In an application, the primary optical communication device and the secondary optical communication device are located in the same physical space, so that the optical signal emitted by the signal lamp of the primary optical communication device may be detected by the secondary optical communication device, thereby realizing the optical communication between the primary optical communication device and the secondary optical communication device.

In an embodiment, the optical communication device in all the embodiments of the present application may be equivalently replaced by an ultrasonic communication device, the signal lamp may be equivalently replaced by an ultrasonic generator, and the photovoltaic panel may be equivalently replaced by an ultrasonic receiver, so that ultrasonic networking communication between at least two ultrasonic communication devices is achieved.

The above-mentioned embodiments are only used to illustrate the technical solutions of the present application, but not to limit the present application. Although the present application has been described in detail with reference to the foregoing embodiments, those of ordinary skill in the art should understand that they can still modify the technical solutions recited in the aforesaid various embodiments, or equivalently replace some of the technical features therein. These modifications or replacements do not cause the essence of the corresponding technical solutions to deviate from the spirit and scope of the technical solutions of the embodiments of the present application, and should be included within the protection scope of the present application.

What is claimed is:

1. An optical networking method, wherein the method is applied to an optical communication device of an optical networking system, the optical networking system comprises at least two of the optical communication devices, the optical communication device comprises a signal lamp, and the optical networking method comprises steps of:

converting a natural optical signal into a first pulse current;
controlling the signal lamp to start flickering at a first preset flicker frequency according to the first pulse current;
controlling the signal lamp to start flickering at a second preset flicker frequency according to a preset optical coding data when the optical communication device is arranged as a primary optical communication device, so as to send an optical signal to a secondary optical communication device;
converting the optical signal emitted by the signal lamp of the other optical communication device arranged as the primary optical communication device into a second pulse current when the optical communication device is arranged as the secondary optical communication device;
controlling the signal lamp to start flickering at a third preset flicker frequency according to the second pulse current.

2. The optical networking method of claim 1, wherein the step of controlling the signal lamp to start flickering at the first preset flicker frequency according to the first pulse current comprises:
controlling the signal lamp to start flickering at the first preset flicker frequency at a start time point of a next M-th cycle of the first pulse current according to the first pulse current, wherein, M≥1 and M is an integer.

3. The optical networking method of claim 1, wherein the step of controlling the signal lamp to start flickering at the third preset flicker frequency according to the preset optical coding data comprises:
controlling the signal lamp to start flickering at the third preset flicker frequency at a start time point of a next N-th cycle of the second pulse current according to the preset optical encoding data, wherein, N≥1 and N is an integer.

4. The optical networking method of claim 1, wherein the second preset flicker frequency is equal to the third preset flicker frequency.

5. The optical networking method of claim 1, wherein before controlling the signal lamp to start flickering at the first preset flicker frequency according to the first pulse current, the method comprises a step of:
detecting magnitude of the first pulse current;
wherein the step of controlling the signal lamp to start flickering at the first preset flicker frequency according to the first pulse current comprises:
controlling the signal lamp to start flickering at the first preset flicker frequency when the first pulse current is less than a first preset current threshold.

6. The optical networking method of claim 5, wherein the optical communication device further comprises a rechargeable battery;
and the optical networking method further comprises a step of:
charging the rechargeable battery via the first pulse current.

7. The optical networking method of claim 6, wherein the step of charging the rechargeable battery via the first pulse current comprises a step of:
charging the rechargeable battery via the first pulse current when the first pulse current is greater than or equal to a second preset current threshold.

8. The optical networking method of claim 1, wherein the signal lamp comprises at least one of a signal lamp emitting visible light and a signal lamp emitting infrared light.

9. The optical networking method of claim 1, wherein the optical communication device is electrically connected to a load;
wherein after controlling the signal lamp to start flickering at the third preset flicker frequency according to the second pulse current, the method further comprises:
triggering the load to start working after the signal lamp starts flickering at the second preset flicker frequency for a first preset time when the optical communication device is arranged as the primary optical communication device;
triggering the load to start working after the signal lamp starts flickering at the third preset flicker frequency for a second preset time when the optical communication device is arranged as the secondary optical communication device.

10. An optical communication device, wherein the device comprises:
a signal lamp;
a photovoltaic panel configured to convert a natural optical signal into a first pulse current;
a luminous energy collection and control module, electrically connected to the photovoltaic panel and the signal lamp, and configured to: control the signal lamp to start flickering at a first preset flicker frequency according to the first pulse current, and control the signal lamp to start flickering at a second preset flicker frequency according to a preset optical coding data when an optical communication device is arranged as a primary optical communication device;
wherein the photovoltaic panel is further configured to convert an optical signal emitted by the signal lamp of other optical communication device arranged as the primary optical communication device into a second pulse current when the optical communication device is arranged as a secondary optical communication device;
the luminous energy collection and control module is further configured to control the signal lamp to start flickering at a third preset flicker frequency according to the second pulse current.

11. The optical communication device of claim 10, wherein the optical communication device further comprises:
a rechargeable battery, electrically connected to the signal lamp and the luminous energy collection and control module, and configured to supply power to the signal lamp and the luminous energy collection and control module;
wherein the luminous energy collection and control module comprises:
a voltage detection unit, electrically connected to the photovoltaic panel, and configured to detect magnitude of the first pulse current;
an electronic switch unit electrically connected to the photovoltaic panel;
a control unit, electrically connected to the signal lamp, the voltage detection unit and the electronic switch unit, and configured to: control the signal lamp to start flickering at the first preset flicker frequency when the first pulse current is less than a first preset current threshold, control the signal lamp to start flickering at the second preset flicker frequency according to the preset optical coding data when the optical communication device is arranged as the primary optical communication device, charging the rechargeable battery via the first pulse current;

a voltage stabilizing unit, electrically connected to the electronic switch unit, the control unit and the rechargeable battery, and configured to supply power for the control unit.

12. The optical communication device of claim 11, wherein the luminous energy collection and control module further comprises:
a crystal oscillator unit electrically connected to the control unit and configured to generate a clock signal and output the clock signal to the control unit;
wherein the control unit is further configured to: perform timing according to the clock signal, control the signal lamp to start flickering at the first preset flicker frequency at a start time point of a next M-th cycle of the first pulse current, and control the signal lamp to start flickering at the third preset flicker frequency at a start time point of a next N-th cycle of the second pulse current;
wherein, M≥1, N≥1, and M and N are integers.

13. The optical communication device of claim 12, wherein the control unit and the rechargeable battery are electrically connected to a load;
wherein the control unit, according to the clock signal, is configured to: trigger the load to start working after the signal lamp starts flickering at the second preset flicker frequency for a first preset time, and trigger the load to start working after the signal lamp starts flickering at the third preset flicker frequency for a second preset time.

14. The optical communication device of claim 11, wherein the voltage detection unit comprises a high-precision low-voltage detector.

15. The optical communication device of claim 11, wherein the electronic switch unit comprises a transistor.

16. The optical communication device of claim 11, wherein the control unit comprises a single-chip microcomputer.

17. The optical communication device of claim 11, wherein the voltage stabilizing unit comprises a voltage stabilizing chip or a voltage stabilizing diode.

18. The optical communication device of claim 10, wherein the second preset flicker frequency is equal to the third preset flicker frequency.

19. The optical communication device of claim 10, wherein the signal lamp comprises at least one of a signal lamp emitting visible light and a signal lamp emitting infrared light;
wherein the photovoltaic panel comprises an infrared receiver when the signal lamp comprises the signal lamp emitting infrared light.

20. An optical networking system, wherein the system comprises at least two optical communication devices, and the at least two optical communication devices comprise at least one primary optical communication device and at least one secondary optical communication device:
wherein the optical communication device comprises:
a signal lamp;
a photovoltaic panel configured to convert a natural optical signal into a first pulse current;
a luminous energy collection and control module, electrically connected to the photovoltaic panel and the signal lamp, and configured to: control the signal lamp to start flickering at a first preset flicker frequency according to the first pulse current, and control the signal lamp to start flickering at a second preset flicker frequency according to a preset optical coding data when an optical communication device is arranged as the primary optical communication device;
wherein the photovoltaic panel is further configured to convert an optical signal emitted by the signal lamp of other optical communication device arranged as the primary optical communication device into a second pulse current when the optical communication device is arranged as the secondary optical communication device;
the luminous energy collection and control module is further configured to control the signal lamp to start flickering at a third preset flicker frequency according to the second pulse current.

* * * * *